(12) United States Patent
Kolbitsch et al.

(10) Patent No.: US 8,910,285 B2
(45) Date of Patent: Dec. 9, 2014

(54) METHODS AND SYSTEMS FOR RECIPROCAL GENERATION OF WATCH-LISTS AND MALWARE SIGNATURES

(71) Applicants: Clemens Kolbitsch, Goleta, CA (US); Paolo Milani Comparetti, Goleta, CA (US); Ludovico Cavedon, Santa Barbara, CA (US)

(72) Inventors: Clemens Kolbitsch, Goleta, CA (US); Paolo Milani Comparetti, Goleta, CA (US); Ludovico Cavedon, Santa Barbara, CA (US)

(73) Assignee: Lastline, Inc., Santa Barbara, CA (US)

( * ) Notice: Subject to any disclaimer, the term of this patent is extended or adjusted under 35 U.S.C. 154(b) by 93 days.

(21) Appl. No.: 13/866,979

(22) Filed: Apr. 19, 2013

(65) Prior Publication Data
US 2014/0317735 A1    Oct. 23, 2014

(51) Int. Cl.
G06F 11/00     (2006.01)
H04L 29/06     (2006.01)

(52) U.S. Cl.
CPC .................... H04L 63/145 (2013.01)
USPC ......................................................... 726/23

(58) Field of Classification Search
USPC .......................................................... 726/23
See application file for complete search history.

(56) References Cited

U.S. PATENT DOCUMENTS

| | | | |
|---|---|---|---|
| 8,214,497 B2 | 7/2012 | Alperovitch et al. | |
| 8,296,842 B2 | 10/2012 | Singh et al. | |
| 8,402,543 B1 | 3/2013 | Ranjan et al. | |
| 2008/0244744 A1 | 10/2008 | Thomas et al. | |
| 2009/0271865 A1* | 10/2009 | Jiang | 726/23 |
| 2010/0122317 A1 | 5/2010 | Yadav | |
| 2011/0004935 A1 | 1/2011 | Moffie et al. | |
| 2011/0145926 A1 | 6/2011 | Dalcher et al. | |
| 2011/0231935 A1* | 9/2011 | Gula et al. | 726/25 |
| 2011/0252472 A1 | 10/2011 | Ehrlich et al. | |
| 2011/0302656 A1 | 12/2011 | El-Moussa | |
| 2012/0278890 A1* | 11/2012 | Maatta et al. | 726/23 |
| 2012/0304130 A1 | 11/2012 | Davidson et al. | |
| 2012/0317306 A1 | 12/2012 | Radinsky et al. | |
| 2013/0081136 A1* | 3/2013 | Jiang | 726/22 |
| 2014/0013436 A1* | 1/2014 | Deraison | 726/25 |
| 2014/0201838 A1* | 7/2014 | Varsanyi et al. | 726/23 |

FOREIGN PATENT DOCUMENTS

WO    WO-2008/001972    1/2008

OTHER PUBLICATIONS

"Efficient Detection of Bots in Subscribers019 Computers" IEEE ICC 2009, (2009).
"Exploring Multiple Execution Paths for Malware Analysis," IEEE Symposium on Security and Privacy (May 2007).

(Continued)

Primary Examiner — Teshome Hailu
(74) Attorney, Agent, or Firm — Foley & Lardner LLP; John D. Lanza

(57) ABSTRACT

The present disclosure is directed to methods and systems for reciprocal generation of watch-lists and traffic models characteristic of malicious network activity. In some aspects, the described methods and systems relate to maintaining data for recognition of malicious network activity. In general, the methods include monitoring network traffic; comparing endpoint data from monitored data packets to endpoints in a watch-list of network endpoints and comparing packet data from monitored data packets to traffic models in a catalog of traffic models characterizing malicious network activity; and determining, based on the comparisons, that a set of data packets comprise suspect network activity. The methods include adding a network endpoint to the watch-list when the determination is based on comparing packet data to a traffic model or adding a traffic model to the catalog when the determination is based on comparing endpoint data.

20 Claims, 5 Drawing Sheets

(56) References Cited

OTHER PUBLICATIONS

"Identifying Dormant Functionality in Malware Programs," IEEE Symposium on Security and Privacy (May 2010).
"Jackstraws: Picking Command and Control Connections from Bot Traffic," 20th Usenix Security Symposium (Aug. 2011).
"Practical Taint-Based Protection using Demand Emulation" EuroSys01906, (Apr. 2006).
"Process Out-Grafting: An Efficient 'Out-of-VM' Approach for Fine-Grained Process Execution Monitoring" 18th ACM Conference on Computer and Communications Security (Oct. 2011).
"Protecting Network Traffic Against Spoofed Domain Name System (DNS_Messages" EP 1459171 A2 (Sep. 2001).
"The Underground Economy of Spam: A Botmaster's Perspective of Coordinating Large-Scale Spam Campaigns," 4th Usenix Workshop on Large-Scale Exploits and Emergent Threats, Boston, Mar. 2011.
Matthias Neugschwandtner, Paolo Milani Comparetti, and Christian Platzer, "Detecting malware's failover C&C strategies with squeeze," In Proceedings of the 27th Annual Computer Security Applications Conference (ACSAC 2011). ACM, New York, NY, USA, 21-30.
International Search Report & Written Opinion on PCT/US2014/031439 dated Sep. 2, 2014.

* cited by examiner 350
362
364
```
"""alert tcp $HOME_NET any -> $EXTERNAL_NET $HTTP_PORTS
( msg:"Alert: (Dropper) Pushdo";
```
368
```
flow:to_server,established; content:"POST"; http_method;
urilen:39; content:"/?ptrxcz_"; http_uri;
```
372
```
pcre:"/^\/\?ptrxcz_[a-z0-9A-Z]{30}$/U";
reference:md5,58ffe2b79be4e789be80f92b7f96e20c;
classtype:trojan-activity; sid:1001626; rev:1; )"""
```

METHODS AND SYSTEMS FOR RECIPROCAL GENERATION OF WATCH-LISTS AND MALWARE SIGNATURES

BACKGROUND OF THE INVENTION

The present invention relates generally to the field of computer security. In general, a computing device may have one or more vulnerabilities that can be leveraged by malicious code to compromise the computing device. Malicious code may also be introduced onto a computing device by deceiving a user. Malicious code running on a compromised machine may install additional malware components. Computer security is improved through the detection of malicious software ("malware") that either uses malicious code to exploit vulnerabilities (or deceive users) and repurpose infected computers or performs malicious actions once installed on a compromised host. Once malware is detected and the exploits are understood, security systems may be designed to recognize and block the malware and the vulnerabilities may be patched.

SUMMARY OF THE INVENTION

The present disclosure is directed to methods and systems for reciprocal generation of watch-lists and traffic models. Generally, a watch-list of endpoints known for, or suspect of, malicious network activity can be used to block access to those endpoints. The endpoints may be, for example, a command and control center, an exploit delivery site, a malware distribution site, a bot in a peer-to-peer network, a traffic generation site, or any other endpoint considered malicious. Generally, traffic models can be used to recognize network traffic with similar patterns or contents. A traffic model can be designed or generated to match network traffic associated with, contributing to, or otherwise characterizing malicious network activity. Signature characteristics of such network traffic may be used as a traffic model to identify a malicious endpoint and, reciprocally, characteristics of other network traffic to an identified malicious endpoint may be used to generate new traffic models.

In one aspect, one embodiment of the invention relates to a method for maintaining data for recognition of malicious network activity. The method includes accessing a watch-list of network endpoints and a catalog of traffic models characterizing malicious network activity. The method includes monitoring network traffic comprising one or more data packets and collecting a set of data packets from the network traffic. The method includes comparing endpoint data from the collected data packets to endpoints in the watch-list of network endpoints and comparing packet data from the collected data packets to traffic models in the catalog of traffic models characterizing malicious network activity. The method includes determining, based on one of the comparing endpoint data and the comparing packet data, that the set of data packets comprise suspected malicious network activity and adding, responsive to the determining, one of: (a) at least one network endpoint identified in the endpoint data from the collected data packets to the watch-list of network endpoints when the determining is based on comparing packet data to a traffic model, and (b) a traffic model generated based on packet data from the collected set of data packets to the catalog of traffic models for malicious network activity when the determining is based on comparing endpoint data.

In some embodiments, the method further comprises generating a traffic model based on the monitored or collected data packets. In some embodiments, the method further comprises sniffing the packets from a network. In some embodiments, monitoring the network traffic comprises sniffing packets. In some embodiments, collecting the set of data packets from the network traffic comprises filtering network traffic. In some embodiments, collecting the set of data packets from the network traffic comprises identifying one or more data packets associated with one or more computing processes involved in the execution of suspect computer code. The data packets may have been originated by or read by one of the one or more process. In some embodiments, the computing processes are executed in a virtual machine. For example, the execution environment may leverage hardware-based virtualization.

In one aspect, one embodiment of the invention relates to a system for maintaining data for recognition of malicious network activity. The system comprises one or more network interfaces and one or more computing processors each configured to utilize at least one of the one or more network interfaces. The one or more computing processors are configured to monitor, via at least one network interface, network traffic comprising one or more data packets. The one or more computing processors are configured to compare endpoint data from the monitored data packets to endpoints in a watch-list of network endpoints. The one or more computing processors are configured to compare packet data from the monitored data packets to traffic models in a catalog of traffic models characterizing malicious network activity. The one or more computing processors are configured to determine, based on the comparisons, if the network traffic comprises suspected malicious network activity. The one or more computing processors are configured to add, responsive to the determination, one of (a) at least one network endpoint from a monitored data packet to the watch-list and (b) a traffic model generated based on one or more monitored data packets to the catalog of traffic models. In some embodiments, the system further comprises computer readable memory storing the watch-list of network endpoints and computer readable memory storing the catalog of traffic models characterizing malicious network activity.

In one aspect, one embodiment of the invention relates to a method of adding a traffic model to a catalog of traffic models characterizing malicious network activity. The method includes monitoring network traffic comprising one or more data packets, collecting a set of data packets from the network traffic, comparing a destination endpoint for at least one data packet in the collected set of data packets to one or more network endpoints in a watch-list of network endpoints, and determining, responsive to the comparing, that the collected set of data packets comprise malicious network activity. The method includes generating a traffic model based on the collected set of data packets.

In one aspect, one embodiment of the invention relates to a method of adding a network endpoint to a watch-list of network endpoints. The method includes monitoring network traffic comprising one or more data packets, collecting a set of data packets from the network traffic, comparing the collected set of data packets to one or more traffic models in a catalog of traffic models characterizing malicious network activity, and determining, responsive to the comparing, that the collected set of data packets comprise malicious network activity. The method includes identifying a network endpoint participating in the monitored network traffic and adding the identified network endpoint to a watch-list. In some embodiments, the added network endpoint is identified as a source or destination endpoint in the collected set of data packets.

In some embodiments, the traffic model is a regular expression satisfied by content in one or more of the monitored data packets. In some embodiments, the regular expression is satisfied by content that is one or more of a packet header, routing information, and packet payload data. In some embodiments, an endpoint is identified as one or more of a command and control center, an exploit delivery site, a malware distribution site, a bot in a peer-to-peer network, a traffic generation site, or a spam generation site.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is a diagrammatic view of one embodiment of a traffic model; and

DETAILED DESCRIPTION OF THE PREFERRED EMBODIMENTS

Figure 1:
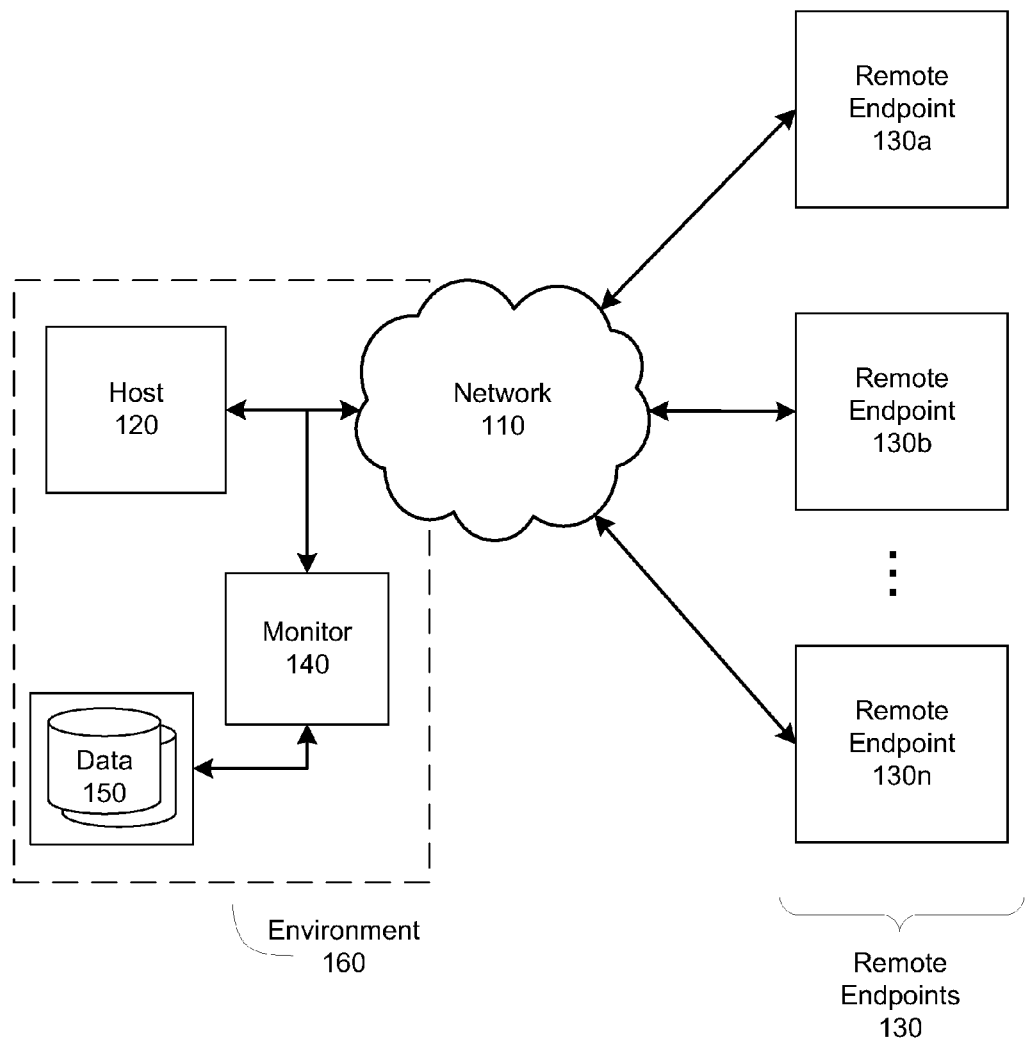
FIG. 1 is a block diagram illustrating one embodiment of computing systems in a network environment.

Following below are more detailed descriptions of various concepts related to, and embodiments of, methods, apparatuses, and systems introduced above. The various concepts introduced above and discussed in greater detail below may be implemented in any of numerous ways, as the concepts described are not limited to any particular manner of embodiment. Examples of specific embodiments and applications are provided primarily for illustrative purposes.

In general, a computing device connected to a data network may have one or more vulnerabilities that can be leveraged to compromise the computing device. Vulnerabilities include unintentional program flaws such as a buffer with inadequate overrun prevention and intentional holes such as an undisclosed programmatic backdoor. Malicious code can, and has been, developed to exercise these various vulnerabilities to yield the execution of code under the control of an attacker. Malicious code implemented to target a particular vulnerability is sometimes referred to as an exploit. For example, malicious code may access an apparently benign interface and cause a buffer overflow resulting in the placement of unauthorized code in the execution stack where it may be run with elevated privileges. Such an attack could execute an exploit causing the buffer overflow and enabling an unauthorized party to obtain administrative control over the computing device. Commonly, the exploit code downloads additional components of the malware and modify the operating system to become persistent. The computing device, now compromised, may be used for further attacks on other computing devices in the network or put to other malicious purposes.

Some compromised machines are configured to communicate with a remote endpoints, e.g., a command and control ("C&C") system. For example, a compromised machine may check in with a C&C to receive instructions for how the compromised machine should be used (e.g., to send unsolicited e-mails, i.e., "spam," or to participate in a distributed denial-of-service attack, "D-DOS"). A compromised machine is sometimes referred to as a "Bot" or a "Zombie" machine. A network of these machines is often referred to as a "botnet."

Malicious code may be embodied in malicious software ("malware"). As used herein, malware includes, but is not limited to, computer viruses, worms, Trojans, rootkits, and spyware. Malware may generally include any software that circumvents user or administrative controls. Malicious code may be created by an individual for a particular use. Exploits may be created to leverage a particular vulnerability and then adopted for various uses, e.g., in scripts or network attacks. Generally, because new forms of malicious behavior are designed and implemented on a regular basis, it is desirable to recognize previously unknown malicious code.

In some instances, malware may be designed to avoid detection. For example, malware may be designed to load into memory before malware detection software starts during a boot-up phase. Malware may be designed to integrate into an operating system present on an infected machine. Malware may bury network communication in apparently benign network communication. Malware may connect to legitimate network endpoints to obscure connections to control servers or other targets. In some instances, malware behaves in an apparently benign manner until a trigger event, e.g., a set day, arrives. In some instances, malware is reactive to environmental conditions. For example, malware may be designed to behave in an apparently benign manner in the presence of malware detection software.

Generally, suspicious computer code may be identified as malware by observing interactions between the suspicious computer code and remote network endpoints. Suspicious computer code may generate or receive data packets via a data network. For example, if a data packet has a source or destination endpoint matching a known command and control ("C&C") server, then the code may be malicious. Likewise, if content of a data packet is consistent with traffic models ("signatures") for the traffic produced by known malicious code, then the code may be malicious. A watch-list of known or suspected malicious servers (e.g., C&C servers) is maintained and a catalog of traffic models is maintained. When a set of communicated data packets is classified as malicious using the watch-list, the catalog is updated with a model of the data packets. When a set of communicated data packets is classified as malicious using the catalog of traffic models, the watch-list is updated with one or more endpoints data from the data packets. The reciprocal generation of the watch-list and catalog facilitates identification of new malware. For example, a new suspect endpoint may be identified by using a traffic model to recognize malware communicating with the suspect endpoint; additional malware may then be identified when the additional malware communicates with the newly identified suspect endpoint.

FIG. 1 is a block diagram illustrating one embodiment of computing systems in a network environment. A host 120, which is potentially infected with malware, communicates with one or more remote endpoints 130 via a data network 110. The communication is observed by a monitor 140. Even though the monitor 140 is represented as separate from the host, the monitor 140 could also be placed within the host itself. The monitor 140 maintains a watch-list of suspect endpoints and a catalog of traffic models characterizing malicious network activity. In some embodiments, the watch-list and catalog are stored in computer readable memory, illustrated as data storage 150. In some embodiments, the host 120 and the monitor 140 are in a controlled environment 160.

Figure 2:
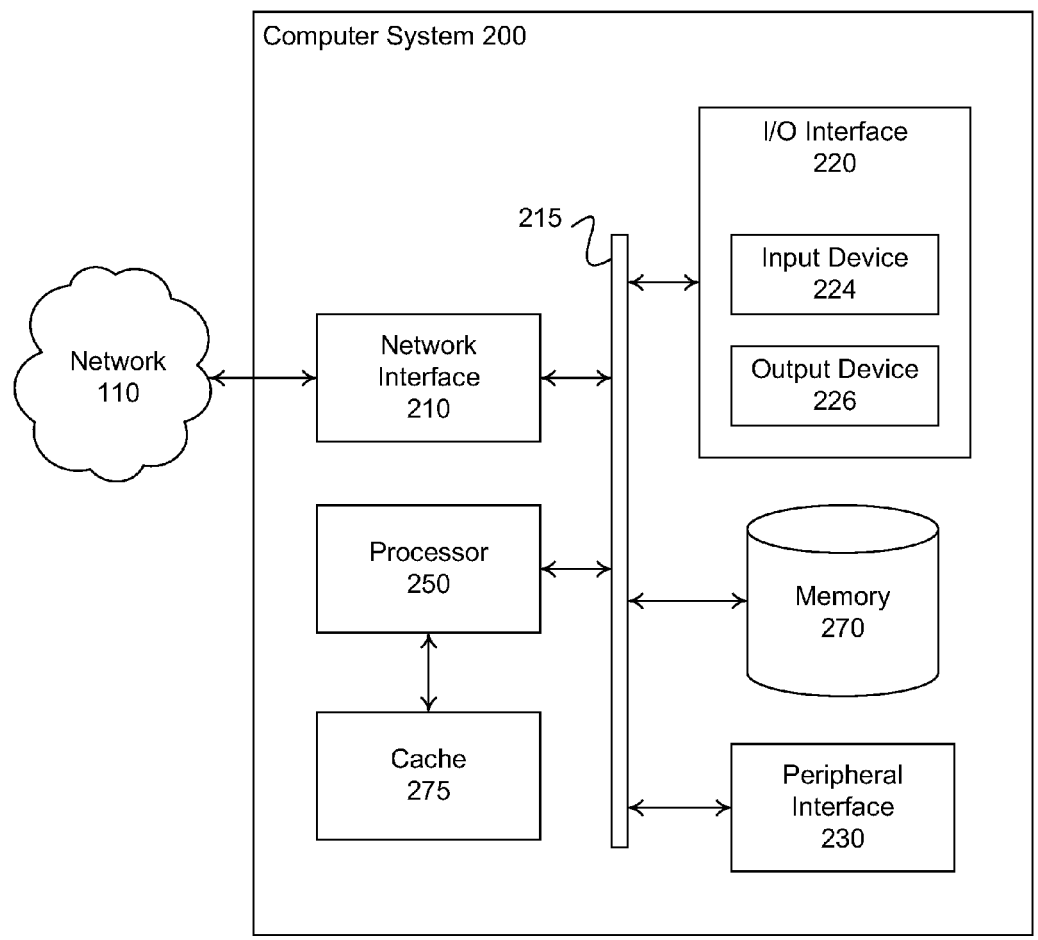
FIG. 2 is a block diagram illustrating one embodiment of a general architecture of a computing device useful in connection with the methods and systems described herein.

The host 120 may be any kind of computing device, including but not limited to, a laptop, desktop, tablet, electronic pad, personal digital assistant, smart phone, video game device, television, server, kiosk, or portable computer. In other embodiments, the host 120 may be a virtual machine. The host 120 may be single-core, multi-core, or a cluster. The host 120 may operate under the control of an operating system, such as any of the operating systems from Apple, Inc. (e.g., OS X or iOS), from Microsoft, Inc. (e.g., Windows NT, MSCS, Windows XP, Windows Server 2008, Windows Server Failover Clustering, Windows 7, or Windows 8), from Google Inc. (e.g., Chrome or Android), or Bell Lab's UNIX and its derivatives (e.g., BSD, FreeBSD, NetBSD, Linux, Solaris, AIX, or HP/UX). Generally, the host 120 may be any computing system susceptible to infection by malware, that is, any computing system. In some embodiments, the host 120 is a computing device 200, as illustrated in FIG. 2 and described below.

The host 120 may communicate with one or more remote endpoints 130 via a data network 110. The network 110 can be a local-area network (LAN), such as a company intranet, a metropolitan area network (MAN), or a wide area network (WAN), such as the Internet and the World Wide Web. The network 110 may be any type and/or form of network and may include any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network. In some embodiments, there are multiple networks 110 between participants, for example a smart phone typically communicates with Internet servers via a wireless network connected to a private corporate network connected to the Internet. The network 110 may be public, private, or a combination of public and private networks. The topology of the network 110 may be a bus, star, ring, or any other network topology capable of the operations described herein.

The remote endpoints 130 may be network addressable endpoints. For example, a remote endpoint 130a may be a data server, a web site host, a domain name system (DNS) server, a router, or a personal computing device. A remote endpoint 130 may be represented by a network address, e.g., domain name or an IP address. An Internet Protocol ("IP") address may be an IPv4 address, an IPv6 address, or an address using any other network addressing scheme. In some embodiments, a remote endpoint 130n is an un-resolvable network address, that is, it may be an address that is not associated with a network device. Network communication to an un-resolvable address will fail until a network device adopts the address. For example, malware may attempt to communicate with a domain name that is not in use.

The communication between the host 120 and the remote endpoints 130 is observed by a monitor 140. In some embodiments, the monitor 140 is a distinct computing system monitoring the communication. For example, the host 120 and the monitor 140 may communicate with the network 110 via a shared router or switch. The monitor 140 may be configured to sniff packets on a local network, e.g., a network within a local computing environment 160. In some embodiments, the host 120 may be a virtual machine and the monitor 140 may be part of the virtual machine monitor ("VMM").

The monitor 140 may maintain a watch-list of suspect endpoints and a catalog of traffic models characterizing malicious network activity. Generally, a watch-list of suspect endpoints is a set of addresses corresponding to remote endpoints 130 that are suspected of engaging in malicious network activity. For example, an address for a remote endpoint 130b that is identified as a C&C server may be added to a watch-list (sometimes referred to as a "black list"). Network communication routed to or from an endpoint on a watch-list may be blocked to prevent operation of malware, such as a botnet. Generally, a traffic model characterizing malicious network activity may be any information set used to recognize network traffic. An example model for recognizing messages between a specific malware loader, a Pushdo loader, and its associated C&C server, is illustrated in FIG. 3 and described in more detail below. Generally, the monitor 140 may compare the contents or routing behavior of communications between the host 120 and a remote endpoint 130n with the traffic models in the catalog.

In some embodiments, the watch-list and catalog are stored in computer readable memory, illustrated as data storage 150. In some embodiments, data storage 150 is random access memory provided by the monitor 140. In other embodiments, data storage 150 is a database. In some embodiments, data storage 150 is a network attached storage system. In some embodiments, data storage 150 is a storage area network. In some embodiments, data storage 150 is geographically distributed. In some embodiments, data storage 150 is cloud-based. In some embodiments, data storage 150 is shared between multiple monitors 140. In some embodiments, data storage 150 stores data entries for each suspected endpoint and each traffic model characterizing malicious network activity.

In some embodiments, the host 120 and the monitor 140 are in a controlled environment 160. For example, the controlled environment 160 may be a local area network. In other embodiments, the host 120 may be a virtual machine and the monitor 140 may be part of the virtual machine monitor ("VMM"). In other embodiments, the monitor 140 may be a subsystem of the host 120.

FIG. 2 is a block diagram illustrating a general architecture of a computing system 200 useful in connection with the methods and systems described herein. The example computing system 200 includes one or more processors 250 in communication, via a bus 215, with one or more network interfaces 210 (in communication with the network 110), I/O interfaces 220 (for interacting with a user or administrator), and memory 270. The processor 250 incorporates, or is directly connected to, additional cache memory 275. In some uses, additional components are in communication with the computing system 200 via a peripheral interface 230. In some uses, such as in a server context, there is no I/O interface 220 or the I/O interface 220 is not used. In some uses, the I/O interface 220 supports an input device 224 and/or an output device 226. In some uses, the input device 224 and the output device 226 use the same hardware, for example, as in a touch screen.

In some embodiments, the host 120, remote endpoints 130, monitor 140, and/or data storage 150, illustrated in FIG. 1, are constructed to be similar to the computing system 200 of FIG. 2. For example, a user of the host 120 may interact with an input device 224, e.g., a keyboard, mouse, or touch screen, to access an interface, e.g., a web page, over the network 110. The interaction is received at the user's device's interface 210, and responses are output via output device 226, e.g., a display, screen, touch screen, or speakers.

In some embodiments, one or more of the systems illustrated in FIG. 1 are constructed to be similar to the computing system 200 of FIG. 2. In some embodiments, a server may be made up of multiple computing systems 200. In some embodiments, a server may be a virtual server, for example, a cloud-based server accessible via the network 110. A cloud-based server may be hosted by a third-party cloud service host. A server may be made up of multiple computing systems 200 sharing a location or distributed across multiple locations. The multiple computing systems 200 forming a server may communicate using the network 110. The multiple computing systems 200 forming a server may communicate using a private network, e.g., a network distinct from a publicly-accessible network or a virtual private network within a publicly-accessible network.

The processor 250 may be any logic circuitry that processes instructions, e.g., instructions fetched from the memory 270 or cache 275. In many embodiments, the processor 250 is a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 200 may be based on any of these processors, or any other processor capable of operating as described herein. The processor 250 may be a single core or multi-core processor. The processor 250 may be multiple processors.

The I/O interface 220 may support a wide variety of devices. Examples of an input device 224 include a keyboard, mouse, touch or track pad, trackball, microphone, touch screen, or drawing tablet. Example of an output device 226 include a video display, touch screen, speaker, inkjet printer, laser printer, dye-sublimation printer, or 3D printer. In some embodiments, an input device 224 and/or output device 226 may function as a peripheral device connected via a peripheral interface 230.

A peripheral interface 230 supports connection of additional peripheral devices to the computing system 200. The peripheral devices may be connected physically, as in a FireWire or universal serial bus (USB) device, or wirelessly, as in a Bluetooth device. Examples of peripherals include keyboards, pointing devices, display devices, audio devices, hubs, printers, media reading devices, storage devices, hardware accelerators, sound processors, graphics processors, antennae, signal receivers, measurement devices, and data conversion devices. In some uses, peripherals include a network interface and connect with the computing system 200 via the network 110 and the network interface 210. For example, a printing device may be a network accessible printer.

The computing system 200 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing system 200 may comprise a gaming device such as a PlayStation (PS 1/2/3/4/x) or Personal PlayStation Portable (PSP) device manufactured by the Sony Corporation of Tokyo, Japan, a Nintendo, Game Boy, or Wii device manufactured by Nintendo Co., Ltd., of Kyoto, Japan, or an XBox or XBox 360 device manufactured by the Microsoft Corporation of Redmond, Wash. For example, the computing system 200 may comprise a tablet device such as one of the iPad family of devices manufactured by Apple Computer of Cupertino, Calif.

FIG. 3 illustrates an example model for recognizing messages. The traffic model 350 recognizes a communication as part of a malicious network activity. The traffic model 350 may include, for example, control information 362, an alert message 364, patterns for protocol information and routing information 368, content patterns 372, hash values 375, classification information 382, and versioning information 384. In the example traffic model 350 illustrated in FIG. 3, a regular expression 372 matches content for a Pushdo loader and a message digest 375 that characterizes the binary program that generated the traffic. The Pushdo loader is malware that is used to install (or load) modules for use of an infected machine as a bot. For example, Pushdo has been used to load Cutwail and create large numbers of spam bots. The traffic model 350 for recognizing Pushdo is provided as an example signature.

Generally, the monitor 140 may compare the contents or routing behavior of communications between the host 120 and a remote endpoint 130n with a traffic model 350, e.g., as found in a catalog of traffic models characterizing malicious network activity. A traffic model 350 may be generated for traffic known to be malicious network activity by identifying characteristics of the network traffic. The traffic model 350 is a type of "signature" for the identified malicious network activity.

A regular expression 372 may be used to identify suspect network communication. A regular expression may be expressed in any format. One commonly used set of terminology for regular expressions is the terminology used by the programming language Perl, generally known as Perl regular expressions, "Perl RE," or "Perl RegEx." (POSIX BRE is also common). Network communications may be identified as matching a traffic model 350 if a communication satisfies the regular expression 372 in the traffic model 350. A regular expression to match a set of strings may be generated automatically by identifying common patterns across the set of strings and generating a regular expression satisfied by a common pattern. In some embodiments, other characteristics are used as a model. For example, in some embodiments, packet length, number of packets, or repetition of packets is used as a model. In some embodiments, content repetition within a packet is used as a model. In some embodiments, timing of packets is used as a model.

A message digest 375 may be used to characterize a block of data, e.g., a binary program. One commonly used message digest algorithm is the "md5 hash" algorithm created by Dr. Rivest. In some embodiments, network communications may be identified if a message digest for a program generating or receiving the communication is equivalent to the message digest 375 in the traffic model 350.

Control information 362 may be used to control or configure use of the traffic model. The example traffic model illustrated in FIG. 3 is applied to TCP flows using port $HTTP_PORTS, e.g., 80, 443, or 8080.

An alert message 364 may be used to signal an administrator that the traffic model has identified suspect network traffic. The alert message 364 may be recorded in a log. The alert message 364 may be transmitted, e.g., via a text message or e-mail. The alert message 364 may be displayed on a screen. In some embodiments, a generic alert message is used. In some embodiments, an alert message is generated based on available context information.

Patterns for protocol information and routing information 368 may indicate various protocols or protocol indicators for the traffic model. For example, as illustrated in FIG. 3, the Pushdo traffic uses the HTTP protocol.

Classification information 382 may be used to indicate the type of suspect network activity. For example, as illustrated in FIG. 3, Pushdo is a Trojan. Other classifications may include: virus, worm, drive-by, or evasive.

Versioning information 384 may be used to assign an identifier (e.g., signature ID) and or a version number for the traffic model.

Figure 4A:
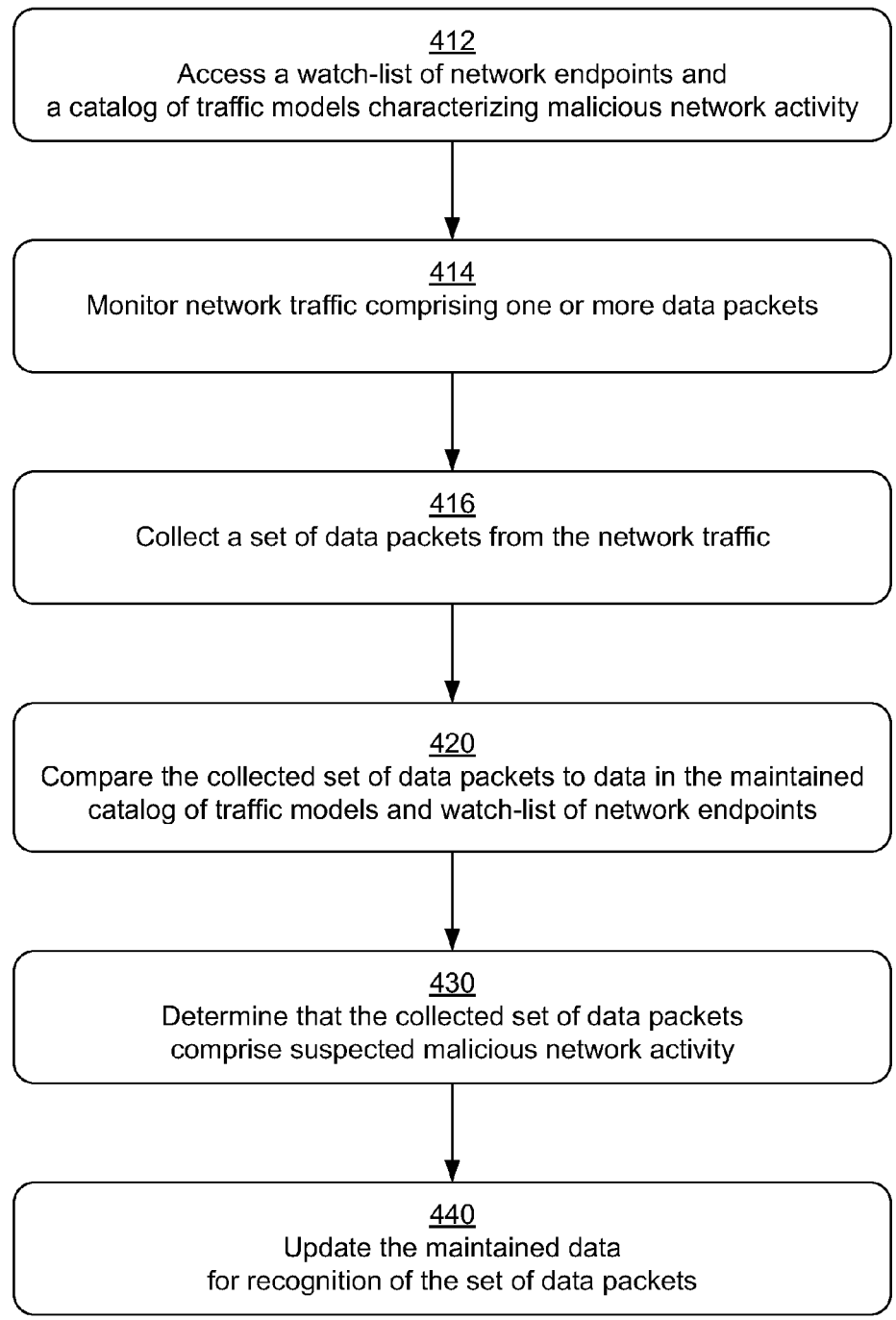
FIGS. 4a-4c are flowcharts depicting the steps taken in one embodiment for the generation of watch-lists and malware signatures.
Figure 4B:
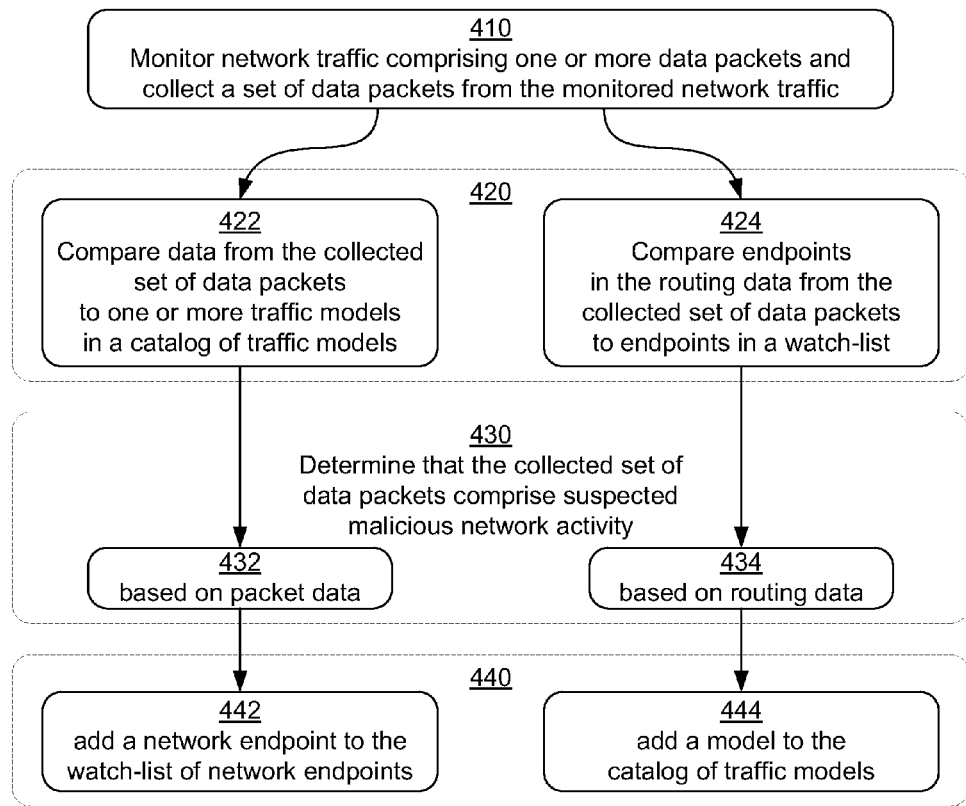
Figure 4C:
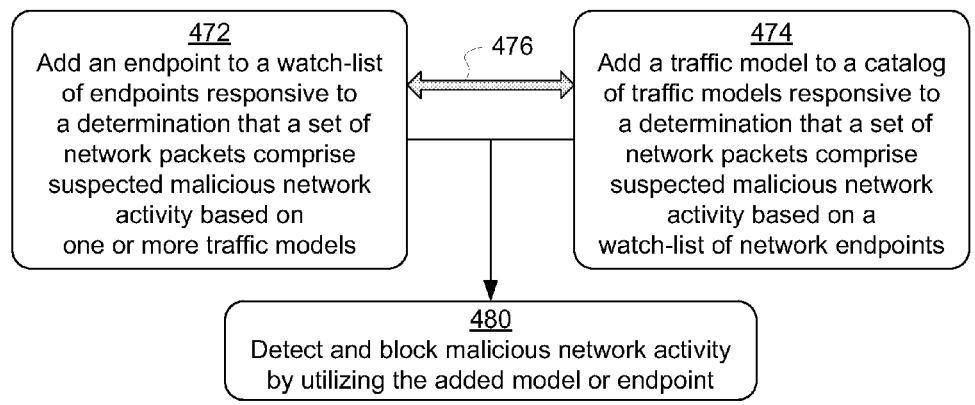

FIGS. 4a-4c are flowcharts illustrating reciprocal generation of data for recognition of malicious network activity.

Referring to FIG. 4: At step 412, a monitor 140 accesses a watch-list of networks and a catalog of traffic models characterizing malicious network activity, e.g., in a data store 150. At step 414, the monitor 140 monitors network traffic comprising one or more data packets. At step 416, the monitor 140 collects a set of data packets from the network traffic. At step 420, the monitor 140 compares data from the collected set of data packets to data in the maintained catalog of traffic models and watch-list of network endpoints. At step 430, the monitor 140 determines that the collected set of data packets comprise suspected malicious network activity. At step 440, the monitor 140 updates the maintained data.

At step 412, a monitor 140 accesses a watch-list of networks and a catalog of traffic models characterizing malicious network activity. In some embodiments, the monitor 140 accesses the watch-list and catalog in one or more data stores 150. In some embodiments, the monitor 140 accesses collaboratively maintained data shared with other monitors. In some embodiments, the monitor 140 maintains the watch-list and catalog data locally. In some embodiments, the watch-list is stored at a location distinct from the catalog and the monitor 140 accesses the data separately.

At step 414, the monitor 140 monitors network traffic comprising one or more data packets. Data packets generally comprise header data and payload data (collectively referred to as packet data). The header data generally comprise routing information, such as a source network address, a destination network address, protocol information, and packet description information (e.g., packet size or TTL). The payload data may contain content, content fragments, or packet data for a higher-layered protocol. Thus the payload data may, in turn, contain additional header data. In some embodiments, the monitor 140 sniffs data packets on a local network, e.g., a LAN in environment 160. In some embodiments, the host 120 is a virtual machine and the monitor 140 is part of the virtual machine monitor (VMM). In some embodiments, the monitor 140 inspects packets at a network interface, e.g., via a modified network interface driver. In some embodiments, the monitor may act as a gateway between the host 120 and the external network.

At step 416, the monitor 140 collects a set of data packets from the network traffic. The monitor may collect all monitored packets or collect a set of packets based on rules or filters. In some embodiments, the monitor 140 collects packets originating from one or more source network addresses. In some embodiments, the monitor 140 collects packets originating from one or more source machine addresses. In some embodiments, the monitor 140 collects packets addressed to one or more destination network addresses. In some embodiments, the monitor 140 collects packets using one or more specified protocols. For example, the monitor 140 may restrict collection of packets to HyperText Transfer Protocol (HTTP) packets and File Transfer Protocol (FTP) packets. In some embodiments, the monitor 140 may restrict collection of packets to protocols at any level of the Internet protocol suite. In some embodiments, the monitor 140 may restrict collection of packets to protocols at any level of the Open Systems Interconnection (OSI) model. In some embodiments, the monitor 140 collects packets associated with one or more processes running on the host 120, e.g., processes involved in the execution of suspect computer code. In some embodiments, the monitor 140 identifies one or more packets associated with one or more processes and collects packets originated by one of the one or more processes and packets read by one of the one or more processes. In some embodiments, the monitor 140 generates a log file of network traffic.

At step 420, the monitor 140 compares data from the collected set of data packets to data in the maintained catalog of traffic models and watch-list of network endpoints. The monitor 140 compares one or more packets with the traffic models in the catalog of traffic models. The monitor 140 compares a source address or a destination address in a packet with addresses in the watch-list of network endpoints. In some embodiments, the monitor 140 analyzes a log file of network traffic. In some embodiments, a log analyzer other than the monitor 140 reviews a log file of network traffic and compares data from the collected set of data packets in the log to data in the catalog of traffic models and watch-list of network endpoints.

At step 430, the monitor 140 determines that the collected set of data packets comprise suspected malicious network activity. Generally, if one or more packets satisfy a traffic model (e.g., the signature 350 illustrated in FIG. 3), then the monitor 140 determines that the packets comprise suspected malicious network activity. Likewise, if a packet is addressed to, or addressed from, a network endpoint on the watch-list, then the monitor 140 determines that the packets comprise suspected malicious network activity. In some embodiments, an activity analyzer other than the monitor 140 determines that the collected set of data packets comprise suspected malicious network activity, e.g., based on review of a log file.

At step 440, the monitor 140 updates the maintained data responsive to a determination that the collected set of network packets comprise suspected malicious network activity. In some embodiments, the update is performed externally to the monitor 140. If the determination is made at step 420 that a traffic model in the catalog describes the collected set of packets, then at step 430 an endpoint address in the packet may be added to the watch-list of network endpoints. For example, a destination endpoint for a set of outgoing packets that match the signature 350 for Pushdo may be a previously unknown Pushdo C&C server. The newly identified C&C server address is added to the watch-list of network endpoints. If the determination is made at step 430 that a packet routing data includes a network address for an endpoint on the watch-list of network endpoints, then at step 440 a model generated based on packet data from the collected set of data packets may be added to the catalog of traffic models characterizing malicious network activity. Thus, a traffic model characterizing malicious network activity may be used to identify new endpoints for placement on the watch-list and communication with an endpoint on the watch-list may be used to generate new traffic models.

In some embodiments, the monitor 140 may identify a source endpoint or a destination endpoint as a command and control center, an exploit delivery site, a malware distribution site, another bot (e.g., in a peer-to-peer botnet), or as an endpoint known for malicious network activity. In some embodiments, the watch-list may include metadata regarding each endpoint and the metadata may indicate that a network endpoint is a particular type of site. In some embodiments, different types of endpoints receive different handling. For example, communication with a compromised computing machine acting as a bot, e.g., in a peer-to-peer botnet, may be treated differently than communication with an exploit delivery site.

Referring to FIG. 4b, at step 410, the monitor 140 monitors network traffic one or more data packets and collects a set of data packets from the monitored network traffic. At step 420, the monitor 140 compares data from the collected set of data packets to data in the maintained catalog of traffic models and watch-list of network endpoints. More specifically, at step 422, the monitor 140 compares data from the collected set of data packets to one or more traffic models in the catalog of traffic models and at step 424, the monitor 140 compares endpoints in the routing data from the collected set of data packets to endpoints in the watch-list. At step 430, the monitor 140 determines that the collected set of data packets comprise suspected malicious network activity. That is, at step 432, the monitor 140 determines that the collected set of data packets comprises suspected malicious network activity based on the traffic model comparison in step 422; and at step 434, the monitor 140 determines that the collected set of data packets comprises suspected malicious network activity based on the endpoint watch-list comparison in step 424. At step 440, the monitor 140 updates the maintained data. That is, at step 442, the monitor 140 adds at least one network endpoint from the routing data in the collected set of data packets to the watch-list of network endpoints responsive to the determination in step 432 based on comparing packet data to traffic models; and at step 444, the monitor 140 adds a model generated based on packet data in the collected set of data packets to the catalog of traffic models characterizing malicious network activity responsive to the determination in step 434 based on comparing routing data to the watch-list of endpoints associated with malicious network activity.

Referring to FIG. 4c, malicious network activity is detected based on an added model or endpoint. At step 472, a monitor 140 adds an endpoint to a watch-list of endpoints responsive to a determination that a set of network packets comprise suspected malicious network activity, the determination based on a match between the set of network packets and one or more traffic models. At reciprocal step 474, a monitor 140 adds a traffic model to a catalog of traffic models responsive to a determination that a set of network packets comprise suspected malicious network activity, the determination based on a match between a network endpoint addressed in the set of network packets and a network endpoint in a watch-list of network endpoints. The reciprocal nature 476 of steps 472 and 474 facilitates detecting malicious network behavior that may have been otherwise undetected. At step 480, the monitor 140 detects malicious network activity by utilizing the added traffic model or endpoint and reacts to the detection.

At step 472, a monitor 140 adds an endpoint to a watch-list of endpoints responsive to a determination that a set of network packets comprises suspected malicious network activity, the determination based on a match between the set of network packets and one or more traffic models. For example, as illustrated in FIG. 4b, as in step 410, the monitor 140 monitors and collects a set of data packets; as in step 422, the monitor 140 compares data from the collected set of data packets to one or more traffic models; as in step 432, the monitor 140 determines that the collected set of data packets comprises suspected malicious network activity based on packet data satisfying a traffic model; and as in step 442, the monitor 140 adds a network endpoint to a watch-list of network endpoints. At step 480, the monitor later detects malicious network activity by monitoring a packet and identifying in the packet a network address for the network endpoint added to the watch-list.

At step 476, a monitor 140 adds a traffic model to a catalog of traffic models responsive to a determination that a set of network packets comprises suspected malicious network activity, the determination based on a match between a network endpoint addressed in the set of network packets and a network endpoint in a watch-list of network endpoints. For example, as illustrated in FIG. 4b, as in step 410, the monitor 140 monitors and collects a set of data packets; as in step 424, the monitor 140 compares routing data from the collected set of data packets to network addresses for endpoints in a watch-list of endpoints; as in step 434, the monitor 140 determines that the collected set of data packets comprises suspected malicious network activity based on the routing data indicating a network address on the watch-list; and as in step 444, the monitor 140 adds a traffic model to a catalog of traffic models characterizing malicious network activity. The added traffic model is generated to match the collected set of data packets. At step 480, the monitor later detects malicious network activity by monitoring data packets and identifying that the packets satisfy the traffic model added to the catalog.

The reciprocal nature 476 of steps 472 and 474 facilitates detecting malicious network behavior that may have been otherwise undetected. For example, a monitor 140 may identify malicious network activity based on a first traffic model. The monitor 140 uses the methods illustrated in FIGS. 4a-c and identifies one or more remote endpoints participating in the malicious network activity. The monitor 140 may then identify other network flows engaging the same endpoints and recognize that these other network flows are suspect malicious network activity. The monitor 140 may generate a traffic model for the network flow and the generated model may be used to identify yet more suspect network flows. Thus the reciprocal nature 476 allows a learning feedback.

At step 480, the monitor 140 detects malicious network activity by utilizing the added traffic models or endpoints. The monitor 140 may react to the detection of malicious network activity. In some embodiments, the monitor 140 blocks malicious network activity identified. In some embodiments, the monitor 140 triggers an alarm or other administrative alert when it detects suspected malicious network activity.

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, C, C++, C#, PROLOG, or in any byte code language such as JAVA. The software programs may be stored on or in one or more articles of manufacture as object code.

Having described certain embodiments of methods and systems, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method of detecting suspected malicious network activity, the method comprising:
   accessing, by one or more computing processors, a watch-list of network endpoints and a catalog of traffic models characterizing malicious network activity;

monitoring, by the one or more computing processors, network traffic comprising one or more data packets;

collecting, by the one or more computing processors, a set of data packets from the network traffic;

comparing, by the one or more computing processors, endpoint data from the collected set of data packets to one or more network endpoints in the watch-list of network endpoints;

comparing, by the one or more computer processors, packet data from the collected set of data packets to one or more traffic models in the catalog of traffic models for malicious network activity;

determining, by the one or more computing processors, based on one of the comparing endpoint data with the watch-list and the comparing packet data with the catalog of traffic models, that the set of data packets comprise suspected malicious network activity; and adding, by the one or more computing processors, responsive to the determining, one of:
  a) at least one network endpoint identified from the collected set of data packets to the watch-list of network endpoints when the determining is based on comparing packet data with the catalog of traffic models, and
  b) a model generated based on the packet data from the collected set of data packets to the catalog of traffic models characterizing malicious network activity when the determining is based on comparing endpoint data with the watch-list.

2. The method of claim 1, wherein adding the at least one network endpoint to the watch-list of network endpoints is responsive to a determination that the set of data packets comprise suspected malicious network activity based on comparing packet data from the collected set of data packets to one or more traffic models in the catalog of traffic models characterizing malicious network activity.

3. The method of claim 1, wherein adding a traffic model generated based on the packet data from the collected set of data packets to the catalog of traffic models characterizing malicious network activity is responsive to a determination that the set of data packets comprise suspected malicious network activity based on comparing endpoint data from the collected set of data packets to endpoints in the watch-list of network endpoints.

4. The method of claim 1, further comprising identifying a destination endpoint in the collected set of data packets as one of a command and control center, an exploit delivery site, a malware distribution site, and another bot in a peer-to-peer botnet.

5. The method of claim 1, further comprising generating, by the one or more processors, a traffic model based on the packet data from the collected set of data packets.

6. The method of claim 1, wherein collecting the set of data packets from the network traffic comprises identifying one or more data packets associated with one or more processes involved in the execution of suspect computer code.

7. The method of claim 6, wherein each collected data packet is one of:
  a) a data packet originated by one of the one or more processes, and
  b) a data packet read by one of the one or more processes.

8. The method of claim 6, wherein the one or more processes are executed in a virtual machine.

9. The method of claim 6, wherein the one or more processes are executed in an environment that leverages hardware-based virtualization.

10. The method of claim 6, wherein the one or more processes are executed on one or more computing processors that are distinct from the one or more computing processors monitoring network traffic.

11. The method of claim 1, wherein monitoring traffic comprises sniffing packets on a network.

12. A system for detecting suspected malicious network activity, the system comprising:

at least one network interface;

computer readable memory storing a watch-list of network endpoints;

computer readable memory storing a catalog of traffic models for malicious network activity; and one or more computing processors configured to:
  monitor, via the at least one network interface, network traffic comprising one or more data packets;
  collect a set of data packets from the network traffic;
  compare endpoint data from the collected set of data packets to network endpoints in the watch-list of network endpoints;
  compare packet data from the collected set of data packets to one or more traffic models in the catalog of traffic models for malicious network activity;
  determine, based on one of the comparing endpoint data and the comparing packet data, that the set of data packets comprise suspected malicious network activity; and
  add, responsive to the determining, one of:
    a) at least one network endpoint identified from the collected set of data packets to the watch-list of network endpoints when the determining is based on comparing packet data with the catalog of traffic models, and
    b) a model generated based on the packet data from the collected set of data packets to the catalog of traffic models characterizing malicious network activity when the determining is based on comparing endpoint data with the watch-list.

13. The system of claim 12, wherein adding the at least one network endpoint to the watch-list of network endpoints is responsive to a determination that the set of data packets comprise suspected malicious network activity based on comparing packet data from the collected set of data packets to one or more traffic models in the catalog of traffic models characterizing malicious network activity.

14. The system of claim 12, wherein adding a traffic model generated based on the packet data from the collected set of data packets to the catalog of traffic models characterizing malicious network activity is responsive to a determination that the set of data packets comprise suspected malicious network activity based on comparing endpoint data from the collected set of data packets to endpoints in the watch-list of network endpoints.

15. The system of claim 12, wherein the one or more processors are further configured to identify a destination endpoint in the collected set of data packets as one of a command and control center, an exploit delivery site, a malware distribution site, and a bot in a peer-to-peer network.

16. The system of claim 12, wherein the one or more processors are further configured to generate a traffic model based on packet data from the collected set of data packets.

17. The system of claim 12, wherein the one or more processors are configured to collect the set of data packets from the network traffic by identifying one or more data packets associated with one or more processes involved in the execution of suspect computer code.

18. The system of claim 17, wherein each collected data packet is one of:
   a) a data packet originated by one of the one or more processes, and
   b) a data packet read by one of the one or more processes.

19. The system of claim 12, wherein the one or more processors are configured to execute the one or more processes in a virtual machine.

20. The method of claim 19, wherein the one or more processes are executed in an environment that leverages hardware-based virtualization.

* * * * *